United States Patent [19]

McMahon

[11] 4,300,122
[45] Nov. 10, 1981

[54] APPARATUS FOR PROCESSING DIGITAL DATA REPRESENTATIVE OF A TWO-DIMENSIONAL IMAGE

[75] Inventor: Donald H. McMahon, Carlisle, Mass.

[73] Assignee: Sperry Corporation, New York, N.Y.

[21] Appl. No.: 25,702

[22] Filed: Apr. 2, 1979

[51] Int. Cl.³ ............................................. G06K 9/56
[52] U.S. Cl. .................. 340/146.3 MA; 340/146.3 H; 340/146.3 AC
[58] Field of Search ............. 340/146.3 H, 146.3 MA, 340/146.3 R, 146.3 AC; 364/488, 489, 490, 491, 515; 358/106; 250/363 S

[56] References Cited

U.S. PATENT DOCUMENTS

| | | | |
|---|---|---|---|
| 3,106,698 | 10/1963 | Unger | 340/146.3 H |
| 3,106,699 | 10/1963 | Kamentsky | 340/146.3 H |
| 4,014,000 | 3/1977 | Uno et al. | 340/146.3 MA |
| 4,021,778 | 5/1977 | Ueda et al. | 340/146.3 MA |
| 4,162,482 | 7/1979 | Su | 340/146.3 MA |

FOREIGN PATENT DOCUMENTS

1255653 12/1971 United Kingdom ........ 340/146.3 H

Primary Examiner—Leo H. Boudreau
Attorney, Agent, or Firm—Howard P. Terry

[57] ABSTRACT

An apparatus for processing binary data in line sequential format indicative of the presence of selected features in a two-dimensional binary data point array generates corner codes which classify the nature of such selected features. In one embodiment of the apparatus, means are provided for producing data matrices representative of the states of adjacent binary image points in the array; a corner code generator is coupled with the matrix means for producing the corner codes by analyzing the contents of each data matrix.

14 Claims, 24 Drawing Figures

CODE DATA

CODE DATA

APPARATUS FOR PROCESSING DIGITAL DATA REPRESENTATIVE OF A TWO-DIMENSIONAL IMAGE

BACKGROUND OF THE INVENTION

The present invention relates to apparatus for analyzing line sequential binary data representative of features present in a two-dimensional image.

Where it is desired to process binary data in a two-dimensional format derived from an optical image or the like, it is preferable to represent the features present therein by the smallest possible amount of data. This reduces the required memory capacity where the data is subsequently processed by computer and also reduces processing time, since the amount of data to be processed is minimal. It is also advantageous to convert the data from bit format to word format for computer processing.

One system for producing a binary image for analyzing the metallic patterns on a circuit board is disclosed in U.S. Pat. No. 4,152,723, in the names of Donald H. McMahon and Colin G. Whitney. McMahon et al disclose an apparatus capable of generating binary data in line sequential format to indicate the presence or absence of metallic conductors at selected binary image points on the surface of a circuit board. In this apparatus, a beam of light scans over the surface of the circuit board in sequential parallel scans thus to illuminate the metallic conductors and the insulating substrate on which they are disposed. When the beam is incident on an exposed portion of the insulating substrate, a fluorescent emission therefrom is detected and a binary signal having a first state is generated by the apparatus. When the beam is incident on a metallic conductor, no fluorescent emission results such that in the absence of a detected fluorescent emission, the apparatus produces a binary signal of a second state complementary to the first state. Through the provision of means for synchronizing the scan of the beam with the binary signal produced by the apparatus, a binary image of the surface of the circuit board is generated.

Such an apparatus is capable of producing a vast amount of data. For example, where such apparatus is used to generate a binary image of the surface of a forty inch square circuit board, and where the scanning beam has a one mil resolution such that the binary image points are separated by one mil, a total of 1.6 billion bits of data will be generated by the scanning apparatus. It is desirable to provide an apparatus for reducing this vast amount of data and for processing it simultaneously with the scan of the circuit board so that the need for storing this data for non-real time processing may be avoided.

In addition, an apparatus for processing such data should be capable of distinguishing data which indicates real features on the surface of the board from false data resulting from source of error such as optical noise, non-uniform motion of the scanner caused by bearing noise, and problems associated with image quantization. Bearing noise in the scanner system will result in a shift in scanner position either in a direction of the fast or slow scan resulting in an offset in the image and the appearance of a jog or corner on the surface of the board where in fact there is no such feature. Image quantization is the operation of assigning a discrete binary value to the data representing features at selected binary data points on the surface of the board. Due to limits of resolution, the scanning beam at a given point in time may fall upon an edge feature such that a portion of the beam is incident on the substrate and a portion is incident on metal. Since the fluorescent emission detected by the scanning apparatus is at a very low level, the presence of optical or electrical noise may cause the scanning apparatus to generate either one binary signal level or its complement without regard to the actual feature scanned.

A further complication is introduced where the scanning apparatus is used to scan a circuit board having a metal backing. In such case, the threshold between the level of detected fluorescence which will determine the generation of one binary signal level or its complement must be set very close to the black level such that the sensitivity of the scanning apparatus to optical noise is significantly increased.

In the art of automated character recognition, it is desired to provide a means for rapid and accurate machine reading of information bearing characters, such as alphanumerics. Ideally, an apparatus should be provided which is capable of reliably recognizing handwritten and machine-produced characters despite variations in character size and style, and retaining essential information for reproduction of such characters. At the same time, such an apparatus should be capable of operation in real time; that is, without the need for excessive storage of character information.

SUMMARY OF THE INVENTION

The present invention provides an apparatus for converting binary data in line sequential format indicative of the presence of distinguishable features in a two-dimensional binary data point array to a corner code data format. In one embodiment, the apparatus comprises a data input terminal for receiving the binary data; matrixing means having a matrix input coupled with the data input terminal for providing data matrices at a matrix output representative of the states of binary image points in adjacent rows and columns of said array; corner code generator means coupled with the matrix output to receive the data matrices for producing corner code data indicative of the presence of corner features in said data matrices; and a data output terminal coupled to said corner code generator means for coupling the corner code data to data utilization means.

In a further embodiment of the present invention, the apparatus comprises an input terminal for receiving the binary data; coding means coupled with the input terminal for providing corner codes, each corner code being indicative of corner feature in a corresponding group of binary data representing adjacent points in said two-dimensional array; excess code elimination means coupled with said coding means to receive the corner codes for eliminating corner codes corresponding to horizontally adjacent and vertically adjacent groups of data indicative of complementary corner features; and a data terminal coupled to said elimination means for coupling the remaining corner codes to data utilization means.

DESCRIPTION OF A PREFERRED EMBODIMENT

Figure 1:
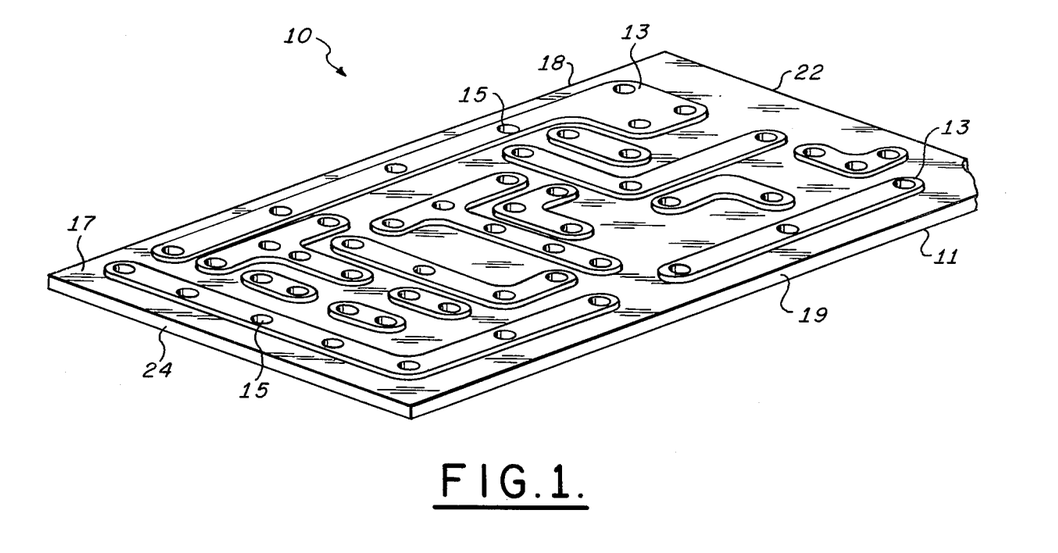
FIG. 1 is a diagrammatic view of a printed circuit board.

FIG. 1 illustrates a printed circuit board having a substrate 11 comprised of an insulating material, such as epoxy glass. Affixed to one surface of substrate 11 are metallic conductive patterns 13 to which various circuit components are conductively affixed and thereby electrically connected to other circuit components. Apertures 15 extend through the substrate and metallic patterns to permit conductive leads from the various circuit components normally mounted on the opposing side of substrate 11, to pass through the substrate 11 and metallic conductive patterns 13, to which they are conductively affixed by soldering.

The above-mentioned U.S. Pat. No. 4,152,723 discloses a scanning apparatus for producing a line sequential digital image of the surface of a circuit board, such as that shown in FIG. 1, to which conductive patterns are affixed. In operation, this scanning system commences a scanning operation of the circuit board of FIG. 1 by causing a beam of light to scan across the surface of the board from a first edge 18 thereof to a second edge 19 thereof in opposed parallel relation to edge 18. The first scan begins adjacent a third edge 22 of circuit board 10 disposed at right angles to edges 18 and 19. Subsequent scans are made parallel to said first scan, each subsequent scan being adjacent the next preceding scan such that the light beam describes a line sequential pattern of scans beginning adjacent edge 22 and continuing to a final scan adjacent an edge 24 of circuit board 10 in opposed relation to edge 22. A clock pulse train for synchronizing the generation of digital data derived from fluorescent emissions from the scanned surface of circuit board 10 with the position of the scanning light beam may be generated either directly from said scanning light beam as described in U.S. Pat. No. 4,152,723 or by a control circuit of the type shown in FIG. 7 of the instant application described hereinbelow.

Figure 2:
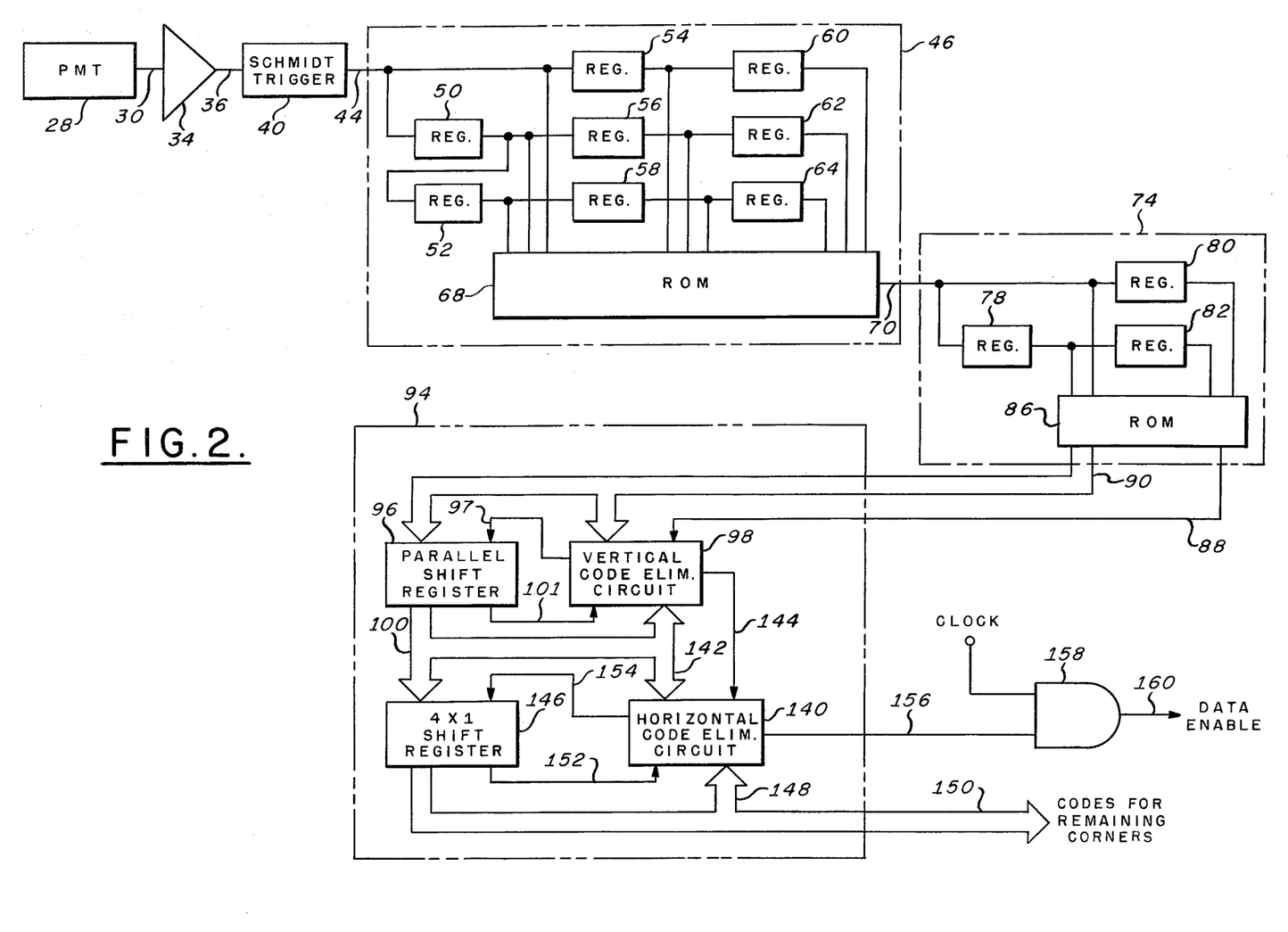
FIG. 2 is a block diagram of one embodiment of the present invention.

FIG. 2 illustrates a circuit according to the present invention capable of reducing the vast amount of data generated as described above by characterizing the surface of the board in terms of corner features of predetermined types each designated by a corner code and of eliminating pairs of corner codes which result from certain causes of error inherent in such a scanning system, or which are unnecessary to represent features on the surface of the board, such that an additional data reduction is achieved. In FIG. 2, a photomultiplier tube (PMT) 28 disposed to detect fluorescent emissions from the surface of the scanned circuit board, as described in U.S. Pat. No. 4,152,723, has an output terminal 30 where a signal is provided having an amplitude proportional to the strength of the detected fluorescent emissions. An amplifier 34 has an input coupled to the output terminal 30 of photomultiplier tube 28 and provides at its output terminal 36 an amplified signal proportional to the signal provided at output terminal 30 of photomultiplier tube 28. Output terminal 36 is coupled to the input of a Schmidt trigger 40 which is operative to produce a binary signal which assumes a ONE state when a signal appearing at output terminal 36 exceeds a predetermined high threshold value and a ZERO state when the signal appearing at output terminal 30 falls below a second, lower threshold value. Schmidt trigger 40 exhibits hysteresis such that the binary signal produced thereby will tend to remain in an existing binary state despite switching noise thus to provide relatively stable operation. Schmidt trigger 40 is coupled to a data input terminal 44 of a smoothing circuit 46 to provide the binary signal thereto.

Briefly, smoothing circuit 46 is operative to compare the binary signals representing nine adjacent binary image points centered about one of the nine points and reassign a binary signal to the one point based upon whether the number of the adjacent points having a given binary state exceeds a predetermined number. This smoothing operation is performed for each binary image point and the resulting reassigned binary signals are provided in sequence to a coding circuit 74.

Coding circuit 74 is operative to arrange the reassigned binary signals in 2×2 matrices and examine each matrix to detect therein one of several possible binary signal patterns; of these, there are eight discrete paterns, referred to hereinafter as corner features, which are used in the embodiment of FIG. 2 for characterizing the surface of the circuit board. Upon the detection of a corner feature in a given matrix, coding circuit 74 produces a numerical code indicating the type of pattern detected along with a corresponding enable signal having a data state indicating that the code produced represents a corner feature. Such codes are termed corner codes.

Corner codes representing corner features resulting from bearing noise, optical noise, and image quantization will appear as horizontally or vertically adjacent complementary codes which may be identified and eliminated. At the same time, corner features which indicate real patterns on the surface of the circuit board and appear as groups of closely spaced corner features, can be represented by a single corner code associated with a single corner feature of each group through the same pairing operation used to eliminate codes produced through bearing noise, optical noise and image quantization. This pairing operation is performed by an excess code elimination circuit 94 of FIG. 2 which is coupled with coding circuit 74 to receive the corner codes and enable signals produced thereby and eliminates the enable signals of those codes corresponding to horizontally adjacent and vertically adjacent corner code pairs indicative of complementary corner features.

A first line shift register 50, having a capacity equal to the number of data points in each scan line, has an input connected to data input terminal 44 and an output connected to an input of a second line shift register 52, having a capacity equal to the capacity of first line shift register 50. In a first rank of single shift registers, each having a capacity equal to one bit, a single shift register 54 has an input connected to data input terminal 44, a single shift register 56 has an input connected to the output of first line shift register 50, and a single shift register 58 has an input connected to the output of second line shift register 52. In a second rank of single shift registers, a single shift register 60 has an input connected to an output of single shift register 54, a single shift register 62 has an input connected to an output of single shift register 56, and a single shift register 64 has an input connected to an output of single shift register 58. Smoothing circuit 46 is also provided with a 512 by 1 read only memory (ROM) 68 having nine address input terminals for receiving an address code which uniquely identifies a selected one of the 512 memory locations, each storing a single bit. Each of said nine address input terminals is connected to a respective one of the output terminals of line shift registers 50 and 52, outputs of single shift registers 54 through 64, and data input terminal 44. Upon receiving a particular address code, ROM 68 will provide a single output bit to an ROM output terminal 70, said output bit having a state equal to that of the single bit stored at the memory location addressed by the address code received by ROM 68. ROM 68 is programmed in accordance with a selected one of several possible memory programs described hereinbelow.

A coding circuit 74 includes a third line shift register 78 having an input connected to ROM output terminal 70, a single shift register 80 having an input connected to ROM output terminal 70, and a single shift register 82 having an input connected to an output of third line shift register 78. Each of single shift registers 80 and 82 has a capacity of one bit. Single shift registers 54–64, 80 and 82 may be, for example J-K flip-flops. Coding circuit 74 further includes a read only memory (ROM) 86 having four address input terminals, each of said four address input terminals being respectively connected to the ROM output terminal 70, the output of the third line shift register 78, and output terminals of single shift registers 80 and 82.

It will be appreciated that a 2×2 bit matrix is thus provided to the address input terminals of ROM 86 and represents, at a given time during the scan of the circuit board, a 2×2 array of binary image points on its surface. This 2×2 bit matrix serves to address one of at least eight possible memory locations, each storing a four bit word. One bit of the four bit word is an enable bit indicating the presence or absence of a corner feature in the 2×2 bit matrix provided to the address input terminals. The enable bit is provided by ROM 86 at an enable bit output terminal 88 thereof. The remaining three bits of the four bit code stored by ROM 86 constitute a corner code specifying the nature of the corner feature appearing in the 2×2 bit matrix and are provided at a three bit output terminal 90 of ROM 86. For reasons set forth hereinbelow, the corner codes assigned to each corner feature are selected such that the sum of corner code pairs which are horizontally or vertically adjacent and which indicate the presence of complementary corner features will sum to a predetermined elimination code.

Excess code elimination circuit 94 which is operative to eliminate horizontally and vertically adjacent corner codes whose sum is equal to a predetermined elimination code of 7, includes a four input parallel shift register 96 and a vertical code elimination circuit 98. Parallel shift register 96 has three of its four inputs coupled with three bit output terminal 90 of ROM 86 to receive the corner codes produced by ROM 86 in parallel format. Three bit output terminal 90 is also coupled to an input of vertical code elimination circuit 98. Single bit output terminal 88 of ROM 86 is connected to a further input of vertical code elimination circuit 98 to provide the enable signal thereto corresponding to a corner code simultaneously provided to vertical code elimination circuit 98 and parallel shift register 96 from three bit output terminal 90. Parallel shift register 96 is selected to provide a capacity of storing corner codes and corresponding enable signals therefor for one complete line of data. Parallel shift register 96 has a corner code output terminal 100 at which will be provided corner codes vertically adjacent to corner codes simultaneously provided to the input of parallel shift register 96 by virtue of the single line capacity of parallel shift register 96. Corner code output terminal 100 is connected to vertical code elimination circuit 98 at a further input thereof to provide corner code data thereto in parallel format. It will be appreciated that the corner code data provided to elimination circuit 98 from corner code output terminal 100 will be vertically adjacent to the corner code data provided to elimination circuit 98 from three bit output terminal 90. Parallel shift register 96 has a single bit input terminal 97 and a single bit output terminal 101 corresponding thereto such that data shifted to terminal 101 will be separated by one line from data provided simultaneously to terminal 97.

Figure 3:
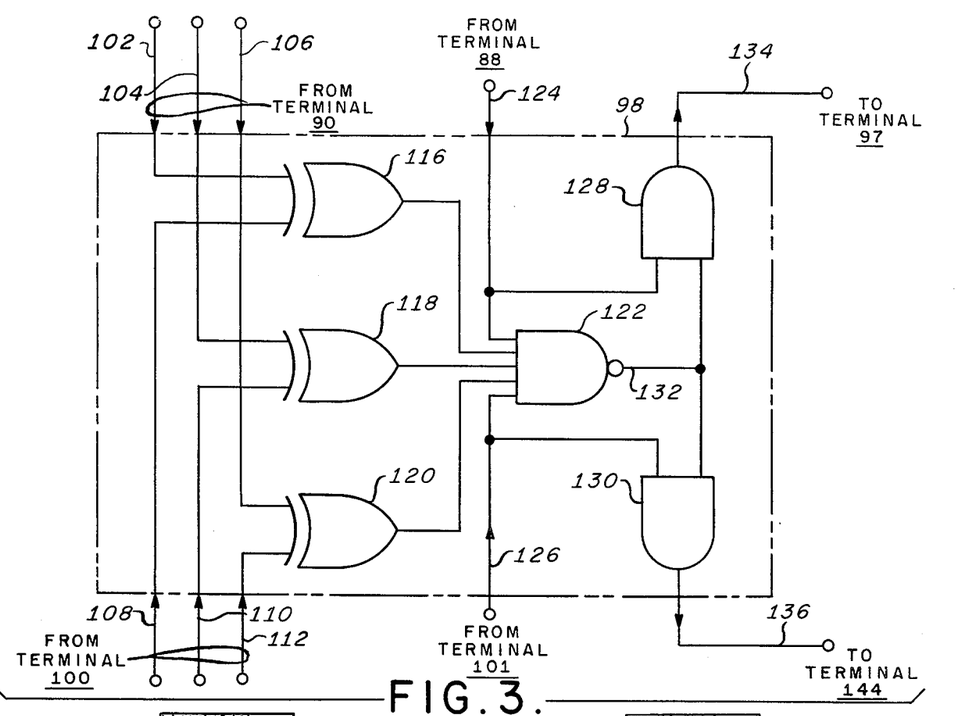
FIG. 3 is a schematic diagram of an excess corner code elimination circuit used in the circuit of FIG. 2.

FIG. 3 shows an embodiment of vertical code elimination circuit 98 wherein three leads 102, 104 and 106 are shown for connecting elimination circuit 98 to three bit output terminal 90. The most significant bit of each three bit corner code provided at terminal 90 is received by elimination circuit 98 on lead 106, the second least significant bit thereof is provided to circuit 98 on lead 104 and the least significant bit thereof is provided to circuit 98 on lead 102. Leads 108, 110 and 112 of elimination circuit 98 are provided for connecting elimination circuit 98 to corner code output terminal 100 of parallel shift register 96. The most significant bit of each corner code provided at corner code output terminal 100 is received by elimination circuit 98 via lead 112, the second least significant bit thereof is received by circuit 98 via lead 110, and the least significant bit thereof is received by elimination circuit 98 via lead 108. Elimination circuit 98 includes a first exclusive OR gate 116, a second exclusive OR gate 118 and a third exclusive OR gate 120, each having a first input terminal and a second input terminal. The first input terminal of first exclusive OR gate 116 is connected to lead 102 to receive the least significant bit of each corner code provided from terminal 90 by ROM 86 and the second input of first exclusive OR gate 116 is connected to lead 108 to receive the least significant bit of each corner code provided at terminal 100. The first input of second exclusive OR gate 118 is connected to lead 104 to receive the second least significant bit thereof from terminal 90 and the second input of second exclusive OR gate 118 is connected to lead 110 to receive the second least significant bit thereof from terminal 100. The first input of third exclusive OR gate 120 is connected to lead 106 to receive the most significant bit thereof from terminal 90 and the second input of third exclusive OR gate 120 is connected to lead 112 to receive the most significant bit thereof from terminal 100. A NAND gate 122 is provided with five input terminals, three of which are connected to respective output terminals of exclusive OR gates 116, 118 and 120. A lead 124 from terminal 88 is connected to a fourth input of NAND gate 122 as well as to a first input of a first two input AND gate 128. A fifth input of NAND gate 122 is connected to a lead 126 from terminal 101 as well as to a first input of a second two input AND gate 130. An output 132 of NAND gate 122 is connected to a second input of AND gate 128 and to a second input of AND gate 130. First AND gate 128 has an output terminal 134 which is connected to input terminal 97 of parallel shift register 96. Second AND gate 130 has an output terminal 136 which is connected to a horizontal code elimination circuit 140 of excess code elimination circuit 94.

Horizontal code elimination circuit 140 is structurally the same as vertical code elimination circuit 98. Elimination circuit 140 has a first three-bit code input terminal 142 having three input leads each corresponding to a respective one of leads 102, 104 and 106 of vertical code elimination circuit 98, said first three-bit code input terminal 142 being connected to terminal 100 of parallel shift register 96, such that the lead of terminal 142 corresponding to lead 106 of vertical code elimination circuit 98 is connected to receive the most significant bit of each code provided at terminal 100, the lead of terminal 142 corresponding to lead 104 of vertical elimination circuit 98 is connected to terminal 100 to receive the second least significant bit of each code provided at terminal 100, and the lead of terminal 142 corresponding to lead 102 of vertical code elimination circuit 98 is connected to terminal 100 to receive the least significant bit of each code provided at terminal 100. Terminal 136 of vertical code elimination circuit 98 is connected to a first single bit input terminal 144 of horizontal code elimination circuit 140, terminal 144 corresponding to terminal 124 of vertical code elimination circuit 98.

Excess code elimination circuit 94 also includes a 4 by 1 shift register 146 having four parallel input terminals and four parallel output terminals. Three of the four parallel input terminals of shift register 146 are connected to terminal 100 of shift register 96 and the three output terminals of shift register 146 corresponding to the three input terminals of 146 connected to terminal 100 are connected to a second three-bit code input terminal 148 of horizontal code elimination circuit 140 having three leads each corresponding to a respective one of leads 108, 110 and 112 of vertical code elimination circuit 98, such that the lead of second three-bit code input terminal 148 corresponding to lead 112 is connected with that output terminal of shift register 146 where the most significant bit of each code is provided, that lead of input terminal 148 corresponding to lead 110 is connected to that output terminal of shift register 146 where the second least significant bit of each code is provided, and that lead of input terminal 148 corresponding to lead 108 of circuit 98 is connected to that output terminal of shift register 146 where the least significant bit of each code is provided. Those three output terminals of shift register 146 corresponding to the input terminals thereof connected to output terminal 100 of shift register 96 are also connected to a remanent corner code output terminal 150 at which the codes received by excess code elimination circuit 94 from otuput terminal 90 of ROM 86 are provided. Horizontal code elimination circuit 140 is also provided with a second single bit input terminal 152 corresponding to terminal 126 of vertical code elimination circuit 98. Input terminal 152 is connected to the fourth output terminal of shift register 146, whereas a single bit output terminal 154 of horizontal code elimination circuit 140, corresponding to terminal 134 of vertical code elimination circuit 98, is connected to the fourth input terminal of shift register 146. An enable signal output terminal 156 of horizontal code elimination circuit 140 corresponds to terminal 136 of vertical code elimination circuit 98. An enable signal having a data state indicating the presence of a valid corner code will be provided to terminal 156 simultaneously with the provision of a corner code to terminal 150 which is not one of a pair of vertically or horizontally adjacent corner codes whose sum is equal to 7. Terminal 156 is connected to a first terminal of a two terminal AND gate 158. The second input terminal of AND gate 158 is provided with a clock signal from a master clock oscillator such that a synchronized enable signal will be provided to a data enable output terminal 160 connected to the output of AND gate 158.

In operation, the binary signal provided to data input terminal 44 will be stored in the first position of first line shift register 50 and in single shift register 54 upon the generation of a first clock pulse signal by the master clock oscillator. Upon the occurrence of a second clock pulse signal, the bit stored in shift register 54 will be shifted to single shift register 60, while shift register 54 will receive the successive binary signal from input terminal 44 and the binary signal stored in the first position of line shift register 50 will be shifted to the second position thereof and the successive binary signal will be stored in the first position thereof. At the end of the first scan line shift register 50 will have stored therein a complete line of data representative of the data states of corresponding data points on the surface of the circuit board on which the scanning beam was incident during the just completed line scan. Upon the beginning of the next line scan the first bit appearing at terminal 44 at the occurrence of the first clock signal of said line scan will represent a data point vertically adjacent the data point represented by the first bit of the previous scan which is simultaneously provided at the output terminal of line shift register 50. Upon the occurrence of the next clock signal the first bit of the second scan will be stored in the first position of line shift register 50 while the first bit of the previous scan will be stored in the first position of second line shift register 52 and in single shift register 56. It will be appreciated that this sequential shifting of data serves to arrange nine bits in a three by three matrix coupled to the nine address input terminals of ROM 68. It will also be appreciated that these nine bits represent nine adjacent binary image points on the surface of the circuit board likewise constituting a three by three square array of points on the surface of the circuit board being scanned.

Figure 4A:
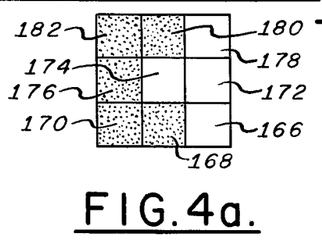
FIGS. 4A through 4F are used for describing the operation of a smoothing circuit used in the circuit of FIG. 2.

FIG. 4A illustrates a three by three array of binary data representing the data states of nine data points on the scanned surface of a circuit board as received at terminal 44 and stored in line shift registers 50 and 52 and single shift registers 54 through 64. If it is assumed that the beam scanning the surface of the circuit board proceeds in successive left to right scans and square 166 of FIG. 4a represents the data state of an arbitrary binary image point illuminated by the beam during one of the scans, square 168 represents the data state of a point immediately to the right of the point represented by square 166 on the same scan line therewith and is, therefore, horizontally adjacent thereto. Square 170, accordingly, represents the data state of a point immediately to the right of the point represented by square 168 on the same scan line therewith. Square 172 represents the state of a point vertically below, i.e., vertically adjacent, the point represented by square 166 such that the bit representing the point of square 172 will be separated from the bit representing the point of square 166 by the number of bits which represent one scan line. Each of squares 174 and 176 represent points to the immediate right of the point represented by square 172 and separated therefrom by one horizontal position and two horizontal positions, respectively. Square 178 represents the state of a point immediately below the point represented by square 172 and, therefore, is vertically adjacent the point of square 172. Squares 180 and 182 represent the data states of points to the right of the point represented by square 178 and separated therefrom by one horizontal data position and two horizontal data positions, respectively. From the foregoing it will be appreciated that if the bit of square 166 is stored in single shift registers 64, the bits represented by squares 172 and 178 will be stored in single shift registers 62 and 60, respectively, and the bits represented by squares 168, 174 and 180, will be stored simultaneously in single shift registers 58, 56 and 54, respectively. In like manner, the bits represented by squares 170, 176 and 182 representing points immediately to the right of the data points represented by squares 168, 174 and 180, will be provided at the output terminals of line shift registers 52 and 50 and at input terminal 44, respectively.

If it is assumed that the unshaded squares represent a ONE binary state, the shaded squares represent a ZERO binary state. Read only memory 68 is programmed preferably to provide a bit having a ONE state at ROM output 70 when at least four of the nine bits provided to the nine address input terminals of ROM 68 have a ONE data state and to provide a ZERO bit at ROM output 70 when fewer than four of said nine bits have a ONE data state. The bit provided at the output terminal 70 of ROM 68 is substituted for the bit stored simultaneously in single shift register 56.

Figure 4B:
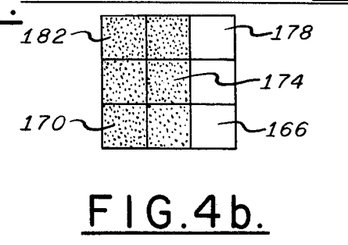
Figure 4C:
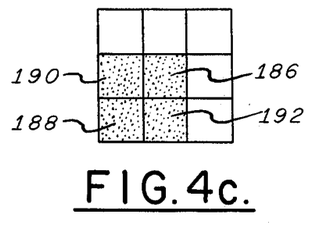
Figure 4D:
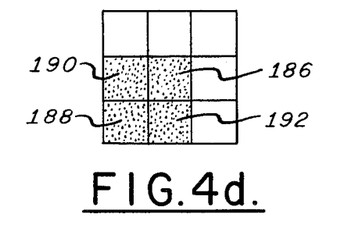

In FIGS. 4A through 4F, exemplary three by three bit square arrays provided to the input terminals of ROM 68 represent three by three square arrays of points on the surface of a circuit board being scanned. FIG. 4A illustrates the type of binary data often provided for a group of points overlying an edge feature on the surface of the circuit board. FIG. 4B shows the array of data of FIG. 4A as it is provided at output terminal 70 of ROM 68 in accordance with the smoothing function described above, and wherein corresponding bits are represented by the same reference numerals as in FIG. 4A. That is, since the bits represented by squares 168, 170, 176, 182 and 180 have a ZERO data state, the data state of the bit represented by square 174 of FIG. 4A is reassigned a ZERO data state by smoothing circuit 46, as shown in FIG. 4B. FIG. 4C, representative of a three by three binary data array provided to the address input terminals of ROM 68 and corresponding to a group of data overlying a typical corner on the surface of a circuit board being scanned, includes a square 186 in the center of the three by three array, a corner square 188, a square 190 vertically adjacent corner square 188 and a square 192 horizontally adjacent to corner square 188, all having a ZERO data state. The remainder of the squares of FIG. 4C illustrate bits having a ONE state. FIG. 4D illustrates the three by three binary data array of FIG. 4C as modified by smoothing circuit 46. Squares corresponding to those of FIG. 4C and, thus representative of corresponding bits, are assigned the same reference numerals. Since four of the nine bits provided to the address input terminals of ROM 68 have ZERO data states, the data state of the bit represented by central square 186 is assigned a ZERO data state by smoothing circuit 146, as shown by FIG. 4D.

Figure 4E:
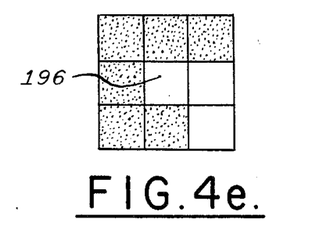
Figure 4F:
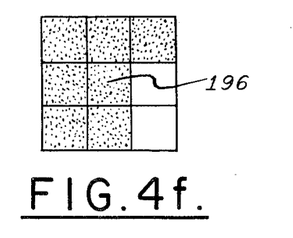

FIG. 4E illustrates a further array of binary data provided to the address input terminals of ROM 68 and representative of the type of data pattern frequently encountered in the case where the points represented by the array overlie an inside corner. Central square 196 of FIG. 4E represents a bit having a ONE data state, whereas six of the remaining eight squares represent bits having a ZERO data state. FIG. 4F represents the data array of FIG. 4E as provided at output terminal 70 of ROM 68. Since six of the nine bits represented by the data array of FIG. 4E have a ZERO data state, the bit represented by central square 196 is reassigned a ZERO data state by smoothing circuit 46, as shown in FIG. 4F. In place of the preferred 4 out of 9 smoothing function performed by ROM 68 as described above, a 5 out of 9 smoothing function may be chosen for ROM 68.

It will be appreciated that, at the beginning and end of each scan line a portion of the data provided to the address input terminals of read only memory 68 will represent points off the surface of the board, and as a consequence the data provided at output terminal 70 is unreliable. Moreover, for the first and second scan lines, as well as for the last scan line, a portion of the data provided to the address input terminals of ROM 68 will represent points off the surface of the board, such that the data then provided to output terminal 70 will likewise be unreliable. In practice, however, these effects are of no real significance since important features normally are not located within two points of any one of the four edges of the circuit board.

Preferably, a plurality of smoothing circuits 46 are provided in the circuit of FIG. 2 and coupled in series so that the data received at data input terminal 44 will be subjected to several successive smoothing operations before it is provided to coding circuit 74. In a preferred embodiment, three smoothing circuits identical to smoothing circuit 46 of FIG. 2 are connected in series relation to perform three successive smoothing operations on the data received at data input terminal 44.

Figure 5A:
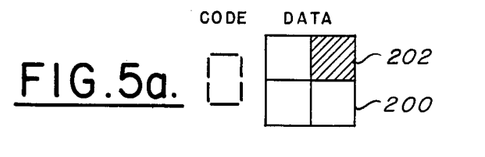
FIGS. 5A through 5M illustrate a system for assigning image codes to image data patterns detected by a circuit board scanner.

FIGS. 5A through 5M illustrate a coding system for use in explaining the operation of coding circuits 74 and excess code elimination circuit 94. FIGS. 5A through 5H each show one of eight possible corner patterns observable in a two by two array of adjacent binary image points and a numerical code assigned to each array. The codes are assigned in the example of FIG. 5 such that pairs of two by two arrays having complementary corner features and which are horizontally adjacent or vertically adjacent are assigned respective numerical codes such that the sum of their codes equals a predetermined elimination code, which in the case of the coding system of FIGS. 5A through 5M is seven. FIG. 5A shows a two by two point array 200 wherein a point 202 at the upper right of the array has a ZERO binary data state, while the remaining three points of array 200 have a ONE data state. Data point array 200 is assigned a corner code of zero and is paired with a two by two point array 204 of FIG. 5H, wherein a point 206 at the lower left of array 204 has a ONE data state, while the remaining points of array 204 have a ZERO data state. Point array 204, if horizontally or vertically adjacent to array 200, will represent a feature complementary to that represented by array 200. Point array 204 is assigned a corner code of seven, such that the sum of the corner codes for arrays 200 and 204 equals seven, the predetermined elimination code.

Figure 5B:
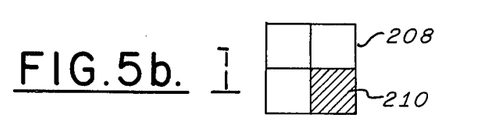
Figure 5C:
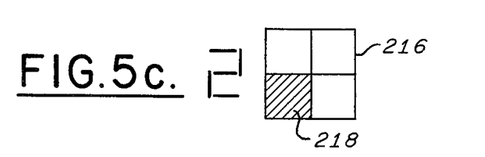
Figure 5D:
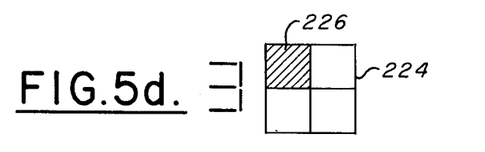
Figure 5E:
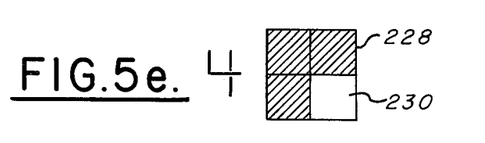
Figure 5F:
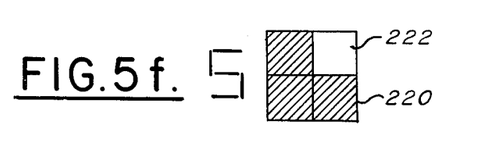
Figure 5G:
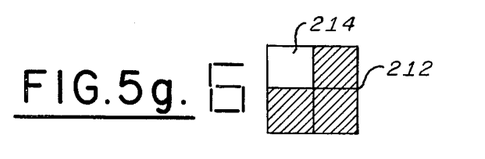
Figure 5H:
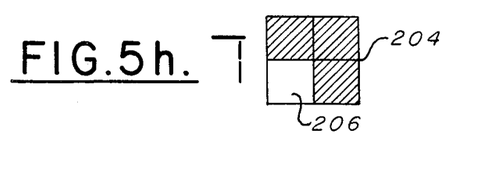

In like manner, FIGS. 5G and 5B illustrate point patterns representative of complementary corner features and appearing horizontally or vertically adjacent to each other. In FIG. 5B a two by two point array 208 has a data point 210 at the lower right position having a ZERO data state, whereas the remaining three points of array 208 have a ONE data state. FIG. 5G shows a two by two point array 210 having a point 214 at the upper left position having a ONE data state, while the remaining three points of array 212 have a ZERO data state. Array 212 of FIG. 5G is assigned a corner code of six, such that the sum of the corner codes for arrays 208 and 212 of FIGS. 5B and 5G respectively sum to the elimination code of seven. FIG. 5C shows a two by two point array 216 having a point 218 at the lower left position thereof having a ZERO data state, while the remaining three points of array 216 have a ONE data state. Array 216 is assigned a corner code of two. FIG. 5F shows a two by two point array 220 having a point 222 at the upper right thereof having a ONE data state, while the remaining points of array 220 have a ZERO data state. Array 220 is assigned a corner code of five. Array 220 of FIG. 5F is paired with Array 212 of FIG. 5C such that the sum of their corner codes equals seven.

FIG. 5D shows a two by two point array 224 having a point 226 at the upper left thereof having a ZERO data state, while the remaining three points of array 224 have a ONE data state. Array 224 of FIG. 5D is assigned a corner code of three. FIG. 5E shows a two by two point array 228 having a point 230 at the lower right thereof having a ONE data state, while the remaining three points of array 228 have a ZERO data state. Array 228 of FIG. 5E is assigned a corner code of four and is paired with array 224 of FIG. 5D, such that the sum of their corner codes is equal to seven.

Figure 5I:
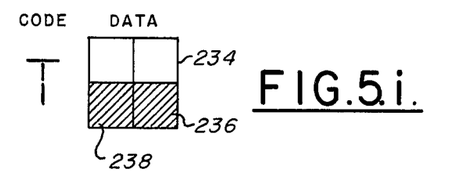
Figure 5J:
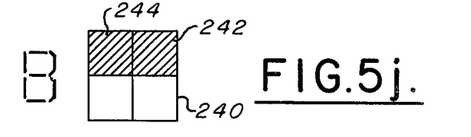
Figure 5K:
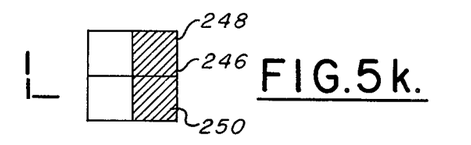
Figure 5L:
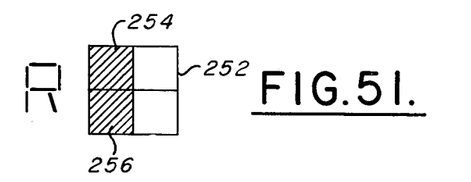
Figure 5M:
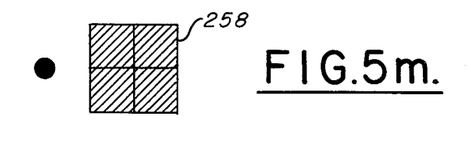

FIGS. 5I through 5L illustrate two by two binary image point arrays representative of four possible edge features. FIG. 5I shows a two by two point array 234 encountered at the top edge of a feature on the surface of a circuit board being scanned. Array 234 includes a point 236 at the lower right thereof and a point 238 at the lower left thereof, each having a ZERO data state, whereas the remaining two points of array 234 have a ONE data state. Array 234 of FIG. 5I is assigned a T code. A two by two point array 240 is shown in FIG. 5J and illustrates a typical array encountered at the bottom edge of a feature on the surface of circuit board. Array 240 has a point 242 at the upper right and a point 244 at the upper left, each of points 242 and 244 having a ZERO data state, while the remaining two points of array 240 have a ONE data state. Array 240 is assigned a B code. FIG. 5K shows a two by two point array 246 illustrative of a typical array encountered at the left edge of a feature on the surface of a circuit board being scanned. Array 246 includes a point 248 at the upper right thereof and a point 250 at the lower right thereof, each of points 248 and 250 having a ZERO data state, while the remaining two points of array 246 have a ONE data state. The array 246 is assigned an L code. FIG. 5L shows a two by two point array 252 typical of a point array encountered at the right edge of a feature disposed on the surface of a circuit board being scanned. Array 252 includes a point 254 at the upper left thereof and a point 256 at the lower left thereof, each of points 254 and 256 having a ZERO data state, while the remaining two points of array 252 have a ONE data state. Array 252 is assigned an R code. In FIG. 5M, a point array 258 is shown in which all four points thereof have a ZERO data state. Array 258 is typically encountered where the data points thereof fall on an interior portion of a metallic conductive pattern on the surface of a circuit board being scanned. Array 258 is assigned a solid black circle as a code.

The operation of coding circuit 74 will now be explained with reference to FIGS. 2, 5 and 6. As explained hereinabove, ROM output terminal 70, third line shift register 78 and single shift registers 80 and 82 are coupled to the address input terminals of read only memory 86 to simultaneously provide thereto a group or matrix of four bits, each bit corresponding to one binary image point of an array of four horizontally and vertically adjacent points. Should the data states of a bit matrix provided to the address input terminals of ROM 86 correspond to one of the binary image point arrays illustrated in FIGS. 5A through 5H, the received matrix indicates the presence of a particular type of corner feature within said matrix. In such case, ROM 86 will indicate the presence of a corner feature by providing an enable signal to single bit output terminal 88 and a binary corner code to three bit output terminal 90 in accordance with the code specified in FIGS. 5A through 5H.

Figure 6:
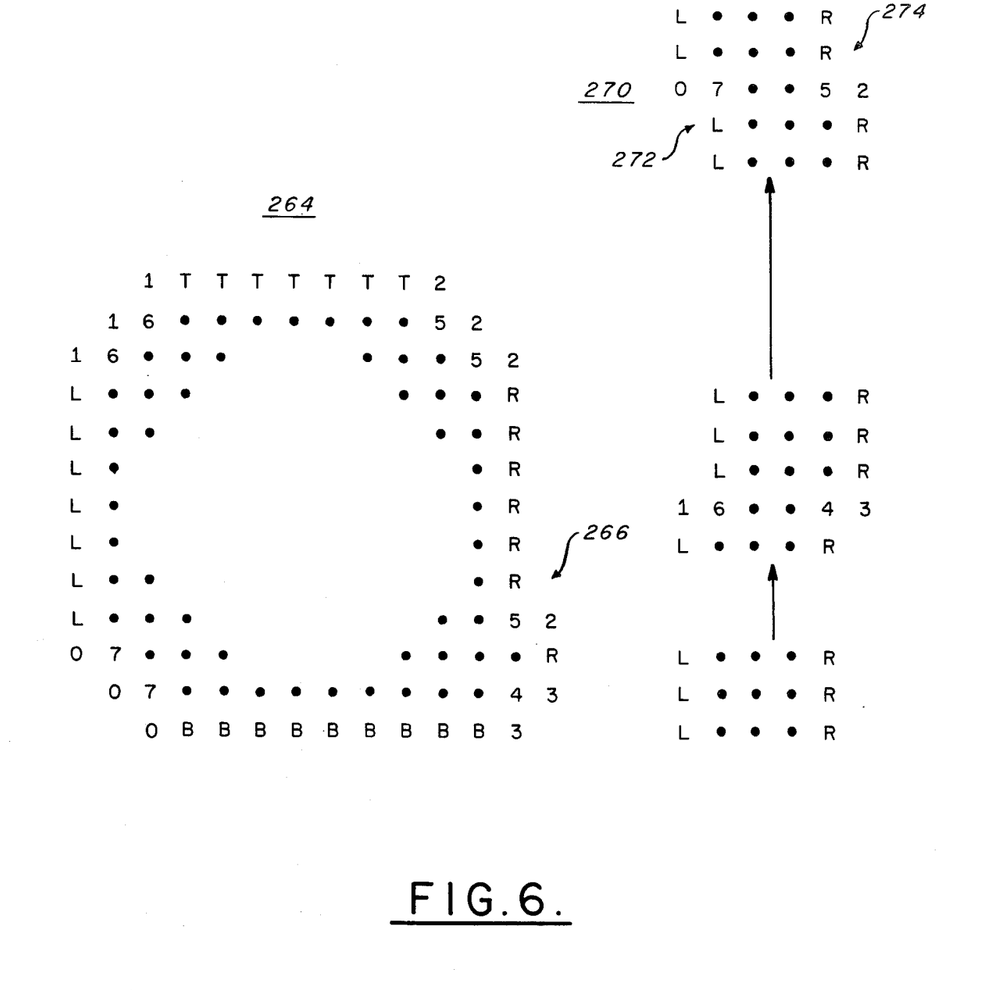
FIG. 6 is a computer printout illustrating surface features of a circuit board using the codes of FIG. 5.

With reference to FIG. 6 a computer printout of the corner code data provided by coding circuit 74 is illustrated in line sequential format using the codes defined in FIG. 5. A data cluster 264 of FIG. 6 is a typical data printout representing a generally rectangular connecting pad on the surface of a circuit board. Due to the somewhat curved corners of the connecting pad represented by data cluster 264, each corner thereof is represented by a plurality of horizontally and vertically adjacent corner codes which, due to the code selection illustrated in FIGS. 5A through 5H, sum to seven. However, the successive elimination in line sequential fashion of vertical and horizontal corner codes whose sum is equal to seven performed by excess code elimination circuit 94 will result in one remaining corner code for each of the four corners of data cluster 264, such that each of the four corners of cluster 264 is represented by a single corner code provided to terminal 150.

A corner code pair 266 of data cluster 264 appears on the right edge thereof. Corner code pair 266 can either represent a slight distortion in the edge of the connecting pad represented by data cluster 264 or can result from bearing noise in the optical scanner which causes a slight horizontal shift of a portion of the received image. In either event, corner code pair 266 is unnecessary data which will be eliminated by excess code elimination circuit 94. FIG. 6 further includes a data segment 270 representative of a segment of a vertically extending conductor on the surface of the circuit board. Corner code pairs 272 and 274 indicate corner features resulting either from a slight bend in the conductor on the surface of the circuit board or as a result of a horizontal line shift due to bearing noise or other cause. Once again, corner code pairs 272 and 274 will be eliminated by excess code elimination circuit 94 as excess data since the sum of the codes of each of pairs 272 and 274 is equal to seven.

The operation of excess code elimination circuit 94 will now be explained with reference to FIGS. 2, 3 and 5. Vertical code elimination circuit 98 is operative to disable those corner codes which are vertically adjacent and whose sum is equal to seven. With reference to FIG. 3, vertical code elimination circuit 98 receives the most significant bit, the second least significant bit and the least significant bit of the corner code from output terminal 90 of ROM 86 on leads 106, 104, 102, respectively, while that corner code which is vertically adjacent to the corner code received from terminal 90 and preceding it is provided from terminal 100 such that the most significant bit, the second least significant bit and the least significant bit are received on leads 112, 110 and 108, respectively. It will be appreciated, that, if the three bit corner codes received from terminals 90 and 100 sum to seven, then each of the bits received on leads 106, 104 and 102 will be the complement of that received on the respective one of leads 112, 110 and 108. In that event, each of exclusive OR circuits 116, 118 and 120 will provide a ONE output to the corresponding input terminal of NAND gate 122. At the same time, the enable signals for the corner codes provided from terminals 90 and 100 will be received simultaneously by circuit 98 on leads 124 and 126 respectively and will have a ONE data state, so that the output provided by NAND gate 122 will have a ZERO state. Accordingly, each of AND gates 128 and 130 will provide a ZERO output to their corresponding outputs 134 and 136. Since outputs 134 and 136 are respectively connected to input terminal 97 of parallel shift register 96 and input terminal 144 of horizontal code elimination circuit 140, the corner code received from terminal 90 of ROM 86 will have a ZERO enable signal associated therewith as stored in shift register 96, while the enable signal associated with the vertically adjacent corner code provided by terminal 100 will be received at terminal 144 as a ZERO signal. In the event, however, that codes received by vertical code elimination circuit 98 from terminals 90 and 100 do not sum to seven, at least one output signal from exclusive OR gates 116, 118 and 120 will have a ZERO state such that the output signal of NAND gate 122 will have a ONE state, thus to gate enable signals received on leads 124 and 126 to leads 134 and 136 through AND gates 128 and 130, respectively. Accordingly, such codes will not be affected by vertical code elimination circuit 98.

Horizontal code elimination circuit 140, having identical circuitry as vertical code elimination circuit 98, is provided with corner codes from terminal 100 at its input terminal 142 and enable signals corresponding thereto at its input terminal 144. If a corner code provided by terminal 100 has immediately preceded the corner code received at terminal 142, and is therefore horizontally adjacent thereto, such corner code will be simultaneously provided to horizontal code elimination circuit 140 at its input terminal 148 and an enable signal corresponding thereto will be provided to input terminal 152 thereof. In the event that the corner codes simultaneously received at terminals 142 and 148 sum to seven, an output signal having a ZERO data state will be provided at enable signal output terminal 156 of horizontal code elimination circuit 140, such that the corner code received at input terminal 148 and simultaneously provided to remanent corner code output terminal 150 will be accompanied by an enable signal having a ZERO data state such that said corner code signal will be disabled. At the same time, a signal having a ZERO data state will be provided to output terminal 154 of horizontal code elimination circuit 140 and will be provided to shift register 146 as the enable signal accompanying the corner code received thereby from terminal 100. Accordingly, both of the horizontaly adjacent corner codes whose sum is equal to seven will be disabled, while the remaining corner codes will not be disabled and will be provided to remanent corner code output terminal 150 accompanied by enable signals having a ONE data state and provided to data enable output terminal 160.

Figure 7:
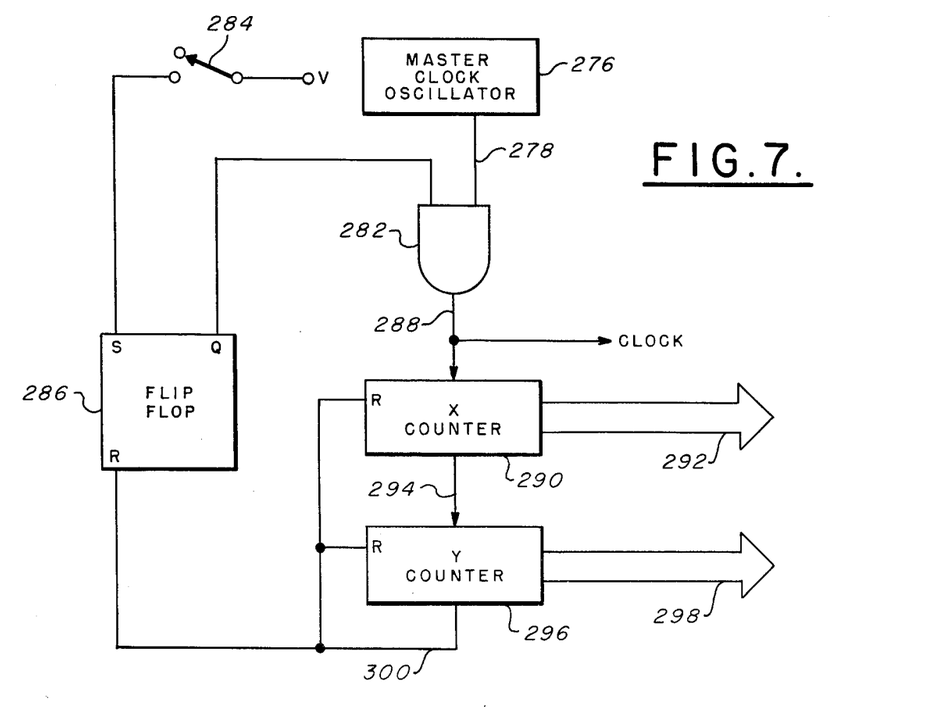
FIG. 7 is a circuit diagram of a control circuit for use with the circuit of FIG. 2.

FIG. 7 shows a control circuit for use with the circuit of FIG. 2 to provide a clock signal thereto and horizontal (X) and vertical (Y) synchronizing data for associating remanent corner codes and their enable signals provided at terminals 150 and 160 with corresponding location on the surface of the circuit board being scanned. A master clock oscillator 276 provides a clock signal at an output terminal 278 thereof to a first of two input terminals of an AND gate 282. A source of direct voltage V is connected to a first switch contact of a momentary contact switch 284. A second contact of switch 284, which is conductively coupled to voltage source V when switch 284 is on is connected to a set (S) terminal of a flip-flop 286. An output terminal (Q) of flip-flop 286 is connected to the other of the two input terminals of AND gate 282. AND gate 282 has an output terminal 288 coupled to the circuit of FIG. 2 to provide a clock signal thereto and to an input terminal of an X counter 290. Counter 290 has a horizontal count output terminal 292 for providing a digital signal indicative of the horizontal or X position of a binary image point on the surface of the circuit board being scanned. Upon the accumulation by X counter 290 of a count equalling the number of image points in a single line scan, X counter 290 provides a pulse to a line count output terminal 294. A Y counter 296 accumulates a count equal to the number of complete line scans made by the scanning apparatus. The Y counter 296 has a vertical count output terminal 298 where a digital signal indicative of the number of complete line scans that have been made by the scanning apparatus is provided. Y counter 296 has a scan termination output terminal 300 at which it provides a scan termination pulse upon the accumulation of a count equal to the total number of lines to be scanned by the apparatus. Scan termination output terminal 300 is connected to reset terminals (R) of flip-flop 286, X counter 290 and Y counter 296.

In operation, the circuit of FIG. 7 is turned on by momentarily closing switch 284 thus to set flip-flop 286. Accordingly, output terminal Q of flip-flop 286 will provide a ONE signal to AND gate 282 so that clock signals from master clock oscillator 276 are then gated to output terminal 288 from which they will then be provided to X counter 290 and the circuit of FIG. 2. Upon the completion of a first scan line, X counter 290 provides a pulse to line count output terminal 294 and automatically resets to zero. Upon the accumulation of a count in Y counter 296 equal to the total number of lines to be scanned, Y counter 296 provides the scan termination pulse to its output terminal 300 which then causes X counter 290 and Y counter 296 to reset to ZERO and flip-flop 286 to reset such that a ZERO signal is provided at its output terminal Q, preventing AND gate 282 from gating clock signals to its output terminal 288.

The signals provided at horizontal count output terminal 292 and vertical count output terminal 298 may be utilized for producing signals to control the operation of horizontal and vertical optical scanners which direct the scanning of the light beam over the surface of the circuit board. However, it is also possible, as described in United States patent application Ser. No. 861,753, to derive clock signals from the scanning light beam itself, which clock signals may be provided to the first input terminal of AND gate 282 in place of the clock signals from master clock oscillator 276. Moreover, conventional optical scanning hardware typically is driven by analog scanning signals from which digital clock signals and horizontal and vertical position signals may be derived for use with the circuitry of FIG. 2 of the instant application.

The corner codes and their associated enable signals provided by terminals 150 and 160 may be displayed, for example, on a cathode ray tube (crt) display for analysis by an operator. Accordingly, the digital signals provided by terminal 292 of X counter 290 and terminal 298 of Y counter 296 provide a means for synchronizing the crt display. The corner codes and their associated enable signals may also be displayed in printed output form, as in FIG. 6, for analysis by an operator. Computer analysis of the corner code data and enable signals for detection of defects in the circuit board is a further means of utilizing the signals provided by the present invention.

The present invention may be used either with computer drawn circuit boards having orthogonal surface features or with hand drawn printed circuit boards having curved surface features. As explained in connection with FIG. 6, curved edges and edges which are not parallel or perpendicular to a scan line appear as a succession of vertically or horizontally adjacent corner code pairs which may be eliminated by the excess corner code elimination circuit 94 of FIG. 2. Smooth curved edges are characterized by the circuit of FIG. 2 by corner codes each associated with points on a given curved edge having a tangent of 45 degrees with respect to the scan line. It will be appreciated from the foregoing that the present invention may be used either for processing data representing circuit boards having orthogonal or curved surface features.

It will be appreciated that the present invention provides an advantageous apparatus for automated character recognition. Both linear and curved features may be characterized by corner features represented by corner codes. Accordingly, characters may be identified and reproduced reliably with minimal data storage and manipulation. It will be recognized that through the use of the corner feature recognition techniques of the present invention, reliable character recognition may be achieved despite variations in character orientation, size and style.

By characterizing a two-dimensional image in terms of corner features, the present invention permits a substantial reduction in the amount of data necessary for representing the useful information contained in that image. By generating a list of corner code features in real time, the present invention substantially reduces the amount of data which must be software processed for feature detection. Accordingly, where software programs are used for analyzing the corner code data provided by the apparatus of the present invention, substantially less data need be stored in memory and substantially less time is required for processing this data. By converting the line sequential binary data to the corner code word format, the present invention permits more effective software processing. One embodiment of the present invention provides an apparatus capable not only of detecting and eliminating false corner data, but also detecting and eliminating all but one corner code in a group of corner codes representative of the same feature in the two-dimensional image, regardless of the size and curvature of that feature, further reducing the amount of data necessary for characterizing the image.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for converting binary data representative of data squares in a two dimensional array to a corner code data format, comprising:

coding means coupled to receive said binary data for providing a multiplicity of corner codes each indicative of one corner feature of a multiplicity of corner features in said two dimensional array, said corner features defined in complementary pairs; and excess code elimination means coupled to receive said corner code data for eliminating corner codes corresponding to horizontally adjacent and vertically adjacent complementary corner features and for providing at an output means remaining corner codes.

2. An apparatus as recited in claim 1 wherein said complementary corner features have values selected to sum to a predetermined elimination code; and wherein said excess code elimination means eliminates vertically adjacent and horizontally adjacent corner code data whose values sum to said predetermined elimination code.

3. An apparatus as recited in claim 2 wherein said coding means comprises:

first matrix means having an input terminal coupled to receive said binary data for providing data matrices with elements that are representative of adjacent binary data in said two dimensional array; and corner code generator means coupled to receive said data matrices for producing said corner codes, each of said corner codes being indicative of a corner feature in said two dimensional array.

4. An apparatus as recited in claim 3 wherein said corner code generator means comprises an ROM.

5. An apparatus as recited in claim 3 wherein said first matrix means comprises:

first line shift register means coupled to said input terminal of said first matrix means and having an output terminal coupled to said corner code generator means for providing to said corner code generator means a data bit in said array vertically adjacent to a data bit of said array most recently entered to said first matrix means;

first single shift register means coupled to said input terminal of said first matrix means and having an output terminal coupled to said corner code generator means for providing to said corner code generator means a data bit in said array horizontally adjacent to said data bit of said array most recently entered to said first matrix means; and second single shift register means coupled to said output terminal of said first line shift register means and having an output terminal coupled to said corner code generator means for providing to said corner code generator means a data bit in said array vertically adjacent to said data bit of said array provided at said output terminal of said first single shift register means and horizontally adjacent to said data bit of said array provided at said output terminal of said first line shift register means.

6. An apparatus as recited in claim 2 wherein said corner codes have assigned values ranging from zero (0)

through seven (7) and said predetermined elimination code equals seven (7).

7. The apparatus of claim 3, wherein said matrix means is operative to provide 2×2 data matrices at its matrix output.

8. The apparatus of claim 2 wherein said coding means is operative to produce an enable signal indicative of the presence of a corner feature, said enable signal being provided to said elimination means along with said corner code; and said elimination means is operative to eliminate those enable signals corresponding to horizontally and vertically adjacent groups of data whose corner code values sum to said predetermined elimination code.

9. The apparatus of claim 1 further comprising smoothing means coupled to receive said binary data for producing a smoothed binary signal for a first data square, said smoothed signal having a value equal to a first binary state when the number of data squares having said first binary number in a group of data squares, including said first data square and data squares adjacent thereto, is equal or greater than a preselected total, and equal to a second binary state when the number of said data squares in said group is less than said preselected total, said smoothed signal being provided to said input terminal of said coding means.

10. The apparatus of claim 9, wherein said number of data squares in said group is equal to nine and said preselected total is equal to four.

11. The apparatus of claim 9, wherein said number of data squares in said group is equal to nine and said preselected total is equal to five.

12. An apparatus as recited in claim 9 wherein said smoothing means comprises:
second matrix means having an input terminal coupled to receive said binary data for providing data matrices with elements that are representative of adjacent binary data in said two dimensional array; and
means coupled to receive said data matrices for reassigning binary signals for said first data square, said reassigned binary signals being coupled to said coding means.

13. An apparatus as recited in claim 12 wherein said second matrix means comprises:
second line shift register means coupled to said input terminal of said second matrix means and having an output terminal coupled to said binary signal reassigning means for providing to said binary signal reassigning means a data bit in said array vertically adjacent to a data bit of said array most recently entered to said second matrix means;
third line shift register means coupled to said output terminal of said second line shift register means and having an output terminal coupled to said binary signal reassigning means for providing to said binary signal reassigning means a data bit in said array vertically adjacent to said data bit of said array provided at said output terminal of said second line shift register means;
third single shift register means coupled to said input terminal of said second matrix means and having an output terminal coupled to said binary signal reassigning means for providing to said binary signal reassigning means a data bit in said array horizontally adjacent to said data bit of said array most recently entered to said second matrix means;
fourth single shift register means coupled to said output terminal of said third single shift register means and having an output terminal coupled to said binary signal reassigning means for providing to said binary signal reassigning means a data bit in said array horizontally adjacent to said data bit of said array provided at said output terminal of said third single shift register means;
fifth single shift register means coupled to said output terminal of said second line shift register means and having an output terminal coupled to said binary signal reassigning means for providing to said binary signal reassigning means a data bit in said array vertically adjacent to said data bit of said array provided at said output terminal of said third single shift register means and horizontally adjacent to said data bit of said array provided at said output terminal of said second line shift register means;
sixth single shift register means coupled to said output terminal of said fifth single shift register means and having an output terminal coupled to said binary signal reassigning means for providing to said binary signal reassigning means a data bit in said array vertically adjacent to said data bit of said array provided at said output terminal of said fourth single shift register means and horizontally adjacent to said data bit of said array provided at said output terminal of said fifth single shift register means;
seventh single shift register means coupled to said output terminal of said third line shift register means and having an output terminal coupled to said binary signal reassigning means for providing to said binary signal reassigning means a data bit in said array vertically adjacent to said data bit of said array provided at said output terminal of said fifth single shift register means and horizontally adjacent to said data bit of said array provided at said output terminal of said third line shift register means; and
eighth single shift register means coupled to said output terminal of said seventh single shift register means and having an output terminal coupled to said binary signal reassigning means for providing to said binary signal reassigning means a data bit in said array vertically adjacent to said data bit of said array provided at said output terminal of said sixth single shift register means and horizontally adjacent to said data bit of said array provided at said output terminal of said seventh single shift register means.

14. An apparatus as recited in claim 13 wherein said binary signal reassigning means comprises a read only memory (ROM).

* * * * *